United States Patent [19]

Owen

[11] 4,352,026
[45] Sep. 28, 1982

[54] MULTI-PHASE CURRENT BALANCING COMPENSATOR

[76] Inventor: Donald W. Owen, 334 Foreman Ave., Norman, Okla. 73069

[21] Appl. No.: 919,225

[22] Filed: Jun. 26, 1978

[51] Int. Cl.³ .............................................. H02J 3/26
[52] U.S. Cl. ...................................... 307/14; 323/253
[58] Field of Search ................. 307/14; 323/89 C, 87, 323/6, 50, 66, 109

[56] References Cited

U.S. PATENT DOCUMENTS

| | | | |
|---|---|---|---|
| 2,798,196 | 7/1957 | Hage | 323/66 |
| 2,808,519 | 10/1957 | Rau | 307/14 |
| 3,045,126 | 7/1962 | Morgan | 307/14 |
| 3,075,139 | 1/1963 | Balteau | 323/66 |
| 3,171,967 | 3/1965 | Schaefer | 307/14 |
| 3,193,605 | 7/1966 | Dreyfus | 13/12 |
| 3,292,076 | 12/1966 | Wickenhagen | 323/89 |
| 3,676,766 | 7/1972 | Blackmond | 323/6 |
| 3,991,359 | 11/1976 | Thompson | 323/4 |

FOREIGN PATENT DOCUMENTS 596123 4/1934 Fed. Rep. of Germany ........ 307/14

OTHER PUBLICATIONS

ESCO Negative Sequence Compensator, ESCO Manufacturing Co., 7-10-76.

Primary Examiner—G. Z. Rubinson
Assistant Examiner—S. D. Schreyer
Attorney, Agent, or Firm—William R. Laney; E. Harrison Gilbert, III

[57] ABSTRACT

An apparatus which automatically balances the magnitudes of each phase current in a multi-phase power system includes electrical conductors, or phase lines, variable reactance evices, and control elements. Each phase line connects to a variable reactance device which can change the reactance of the line to thereby control the magnitude of the phase current. The variation of the reactance in one line is controlled by a control element which supplies the reactance device with a direct current converted from the alternating current of another phase line. This direct current generates a magnetic field which saturates the reactance device and thereby balances the controlled phase's current by interacting with the magnetic fields generated in the reactance device by that phase's alternating current. Total balancing is obtained by concatenating the control elements to reactance devices of all phases, i.e., one phase controls a second phase, the second controls a third, . . ., the $n^{th}-1$ controls the $n^{th}$, and the $n^{th}$ phase controls the first phase.

17 Claims, 9 Drawing Figures

MULTI-PHASE CURRENT BALANCING COMPENSATOR

BACKGROUND OF THE INVENTION

1. Field of the Invention

This invention relates generally to apparatus for controlling the magnitude of alternating electrical current and more particularly, but not by way of limitation, to apparatus for balancing the magnitudes of the phase currents of a three-phase power system. 2. Description of the Prior Art (Prior Art Statement)

The following statement is intended to be a prior art statement in compliance with the guidance and requirements of 37 C.F.R. §§1.56, 1.97 and 1.98 and of ≳6.09 of the *Manual of Patent Examining Procedure*.

A number of previously issued patents have disclosed several apparatus for equalizing or balancing the magnitudes of currents or voltages in multi-phase power systems. Two of these patents known to Applicant are believed to be the most pertinent. The first is the patent issued to Rau, U.S. Pat. No. 2,808,519, which discloses a voltage equalizer system wherein two phases of a three-phase system are used to control the third phase. This equalization is accomplished by rectifying two of the phases to provide direct currents to control an adjustable reactance device in the third phase which in turn controls the current of the third phase. From the nature of the elements described in the patent, the third phase is maintained at a magnitude which is the average of the magnitudes of the two controlling phases. The Rau patent further indicates that this type of system is used to compensate for an imbalance created by a single phase load which is connected across the two phases which are used to control the third phase.

Second, the patent issued to Schaefer, U.S. Pat. No. 3,171,967, discloses a device for balancing the magnitudes of all phase currents in a multi-phase rectifier circuit. This device uses each phase current to control a respective current in another phase. This control is accomplished by using adjustable reactor cores which are interconnected with the phase lines.

Additional patents and disclosures which are known to Applicant and believed to be of interest include:

Dreyus, U.S. Pat. No. 3,193,605;
Thompson et al., U.S. Pat. No. 3,991,359
Blackmond, U.S. Pat. No. 3,676,766
Wickenhagen, U.S. Pat. No. 3,292,076
Balteau, U.S. Pat. No. 3,075,139
Morgan et al., U.S. Pat. No. 3,045,126
Hage, U.S. Pat. No. 2,798,196
ESCO, Negative Sequence Compensator As shown by the above-mentioned disclosures, there is a need for a compensating apparatus to balance the magnitudes of every phase current in a multi-phase power system. There is also the need for such a device to automatically balance the phase currents without having mechanical or other types of adjustments made to it. Furthermore, there is the need for a compensator which satisfies the above two needs and yet is efficient in size, weight and cost.

The previous disclosures, however, do not describe a compensator which meets these needs while automatically balancing every phase regardless of the cause of unbalance. Additionally, the devices of the prior disclosures have disadvantages which the present invention does not have.

One disadvantage of the Rau patent is that it fails to disclose a device for compensating more than a single phase. Furthermore, the compensation resulting from the Rau system does not balance the phase currents to the degree that the present invention does because due to the nature of the reactance adding device described therein, the magnitude of the compensated phase is only the average magnitude of the two controlling phases. Although the average of two equal phases would result in the third phase also being equal, generally no two phases of a three-phase power system are identical. Additionally, because only one phase contains the reactance adding device, the other two phases remain uncompensated. Finally, the device disclosed in the Rau patent fails to compensate any cause of unbalance unless the two controlling phases are lower than the uncompensated third phase.

A disadvantage of the Schaefer patent is that it fails to disclose a device which automatically balances all phases because the device requires adjustment to be made to the control circuit. Furthermore, the Schaefer patent fails to describe a compensator which balances without regard to the timing differences between the phases.

The other cited patents also have disadvantages because they fail to disclose the relatively simple, individual phase controlling, automatic current balancing compensator of the present invention.

In light of these disadvantages I believe that no previously disclosed device which is known to me indicates, either singly or in combination, the present invention.

SUMMARY OF THE INVENTION

The present invention overcomes the above-noted and other shortcomings of the prior art by providing a novel and improved multi-phase current balancing compensator. This compensator is size, weight and cost efficient and exhibits a simplicity of design not disclosed by the prior art.

Further, the present invention balances the magnitude of the current in every phase of a multi-phase system.

Also, any phase of the multi-phase system can be used to control any other phase, thus obviating phase timing considerations.

Too, compensation occurs automatically; no adjustment is necessary.

Additionally, the cause of the current unbalance is immaterial.

The compensating system of the present invention also results in the magnitude of every phase being equal to the magnitude of every other phase and not merely being the average of the magnitudes of the other phases.

Furthermore, although reference has been and will be made throughout this specification to phase currents and multi-phase systems, the present invention compensates unbalanced magnitudes between any alternating currents regardless of their phase or system relationships.

Structurally, the present invention includes electrical conductors, or phase lines, for attachment to the source and load of the power system, variable reactance means for controlling the current flow of each phase by means of changing the impedance within each phase line, and control means for controlling the reactance means.

Each electrical conductor carries a respective phase current of the power system, and each conductor is also connected to a variable reactance means and to a control means.

Each reactance means has gate windings, control windings, and a core for inductively coupling the windings. The gate windings are the part to which the conductors are connected, and these windings provide either a parallel or a series path to the current in each conductor. The gate windings are associated with the core so that the magnetic field generated by the passage of the phase current through part of the gate windings is always in opposition to the magnetic field created by the passage of a direct current through the control windings.

The control windings are associated with the core so that the passage of a direct current through the windings generates a uni-directional magnetic field and further so that the fields produced by the phase current in the gate windings cancel at the location of the control windings or induce equal and opposite alternating voltages in parts of the control windings for zero net induced voltage.

The function of the system is as follows: The control means in one phase line converts the phase's alternating current into an effectively direct current. The direct current flows through the control winding of the reactance means of a second phase line to thereby establish a magnetic field in and around the core of the reactance means.

This magnetic field opposes the field generated by the passage of the second phase's alternating current through part of the phase's gate windings and adds to the field generated by the current in the other portion of the gate windings. As long as the intensity of the field of the gate windings is not greater than the intensity of the field of the control windings, the gate windings are a low AC impedance for the alternating current. However, once the gate field intensity is greater, the impedance of the gate winding whose field is opposing the control windings' field increases.

This impedance rises because the core is no longer saturated and a back electromotive force (emf) opposes the flow of alternating current. This effectively adds reactance to the phase line connected thereto and thereby raises the line impedance. Due to this interaction of magnetic fields, the current in the second phase is balanced by the current in the controlling phase.

As between any two phases, this balancing causes the alternating current in the controlled phase to be less than or equal to the current in the controlling phase. However, by having each phase control another phase in a circular manner, it can be mathematically shown that each current will equal every other current:

If $|i_1| \leq |i_2|$, $|i_2| \leq |i_3|$, and $|i_3| \leq |i_1|$; then
$|i_1| = |i_2| = |i_3|$.

To obtain this equality, the ratio of the effective direct current flowing through the control windings to the rms value of the alternating current allowed to flow through the gate windings, i.e., the alternating current of the controlled phase, must equal the ratio of the effective direct current to the rms value of the alternating current which generates the direct current, i.e., the alternating current of the controlling phase. The equality of these ratios means that the turns ratio of the control windings to the gate windings of each reactance means is critical because the turns ratio determines the magnitude of the controlled alternating current and thus also determines the ratio of the direct current to the controlled alternating current.

Therefore, from the foregoing, it is a general object of the present invention to provide a novel and improved automatic multi-phase current balancing compensator.

Other and further objects, features and advantages of the present invention will be readily apparent to those skilled in the art upon a reading of the description of the preferred embodiments which follow, when taken in conjunction with the accompanying drawings.

BRIEF DESCRIPTION OF THE DRAWINGS

FIG. 6a is a schematic of a 2-diode rectifier control circuit for use with low current systems.

FIG. 6b is a schematic of the rectifier of FIG. 6a supplemented by a current transformer for use with high current systems.

FIG. 6c is a detailed schematic of a full-wave rectifier control circuit for use with low current systems.

FIG. 6d is a detailed schematic of the FIG. 6c control circuit supplemented by a current transformer for use with high current systems.

DETAILED DESCRIPTION OF PREFERRED EMBODIMENTS OF THE INVENTION

Figure 1:
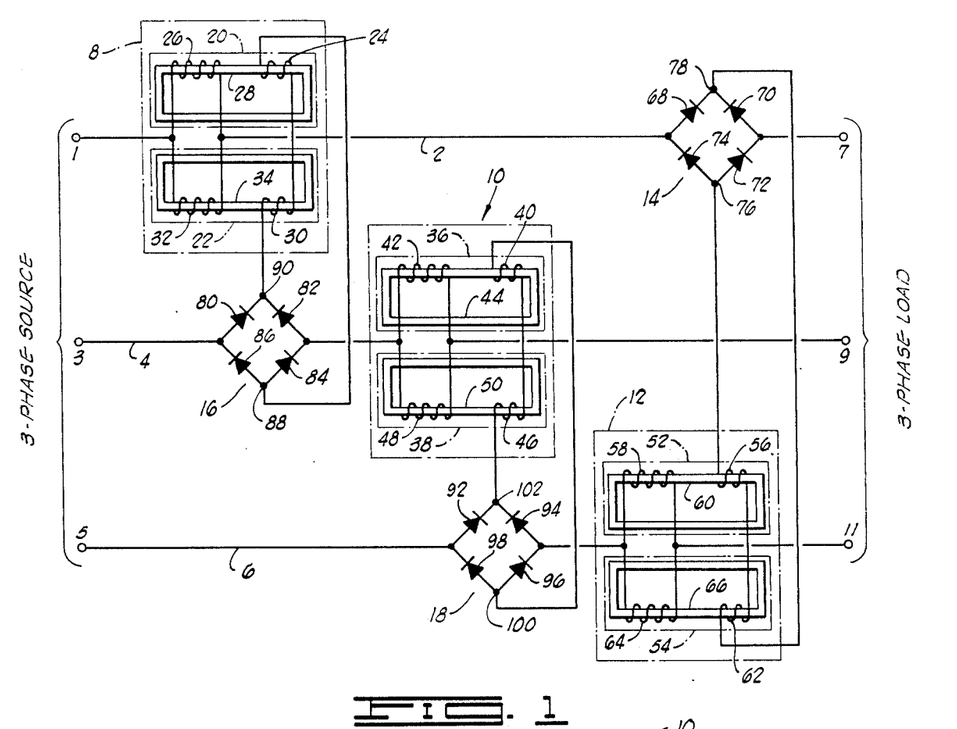
FIG. 1 is one embodiment of the present invention utilizing six standard transformers and three full-wave rectifiers in a three-phase power system.

A preferred embodiment of the present invention as used in a three-phase power system is shown in FIG. 1. The embodiment includes electrical conductors, or phase lines 2, 4 and 6 which interconnect with variable reactance means 8, 10 and 12, respectively, and with control means 14, 16 and 18, respectively.

Phase line 2 terminates at terminal 1 to which one of the phases of a three-phase source is to be connected. Phase line 2 terminates at terminal 7 to which one phase of a three-phase load is to be connected. Similarly, phase line 4 terminates at the source end in terminal 3 and at the load end in terminal 9. Phase line 6, likewise, terminates at the source end in terminal 5 and at the load end in terminal 11.

Variable reactance means 8 comprises two standard transformers 20 and 22. Transformer 20 has both a control winding 24, which has a predetermined number of turns, and a gate winding 26 which has twice the number of turns as control winding 24. Transformer 20 also has a core 28 which inductively couples windings 24 and 26. Transformer 22 includes control winding 30 which has a predetermined number of turns, gate winding 32 which has twice the number of turns as control winding 30, and core 34 for inductively coupling windings 30 and 32. As shown in FIG. 1, the control windings 24 and 30 are directly connected at one end. Gate windings 26 and 32 are connected in parallel with each other, and this parallel connection is inserted into phase line 2 between terminals 1 and 7. The gate windings of all subsequently described reactance means are similarly inserted in line relation with their respective phase lines.

Variable reactance means 10 and 12 are constructed similarly to reactance means 8. Reactance means 10 has transformers 36 and 38. Transformer 36 includes control winding 40 which has a predetermined number of turns, gate winding 42 which has twice the number of turns as control winding 40, and core 44 which inductively couples control winding 40 and gate winding 42. Transformer 38 includes a similar control winding 46, gate winding 48 and core 50. Reactance means 12 comprises both transformer 52 having control winding 56, gate winding 58, and core 60 and transformer 54 having control winding 62, gate winding 64 and core 66. The control and gate windings of transformers 36 and 38 and the windings of transformers 52 and 54 are connected the same as the respective windings in transformers 20 and 22.

Control means 14 is shown in FIG. 1 to be a full-wave rectifier comprising diodes 68, 70, 72 and 74. Control means 14 is connected to control windings 56 and 62 at common anode point 76 and at common cathode point 78. Similarly, control means 16 is a full-wave rectifier which includes diodes 80, 82, 84 and 86 and which interconnects at common anode point 88 and common cathode point 90 with control windings 24 and 30. Control means 18 is a full-wave rectifier which has diodes 92, 94, 96 and 98 and which interconnects control windings 40 and 46 at common anode point 100 and common cathode point 102. FIG. 1 also shows each control means connects to a respective phase line at the remaining two points of each control means.

Figure 2:
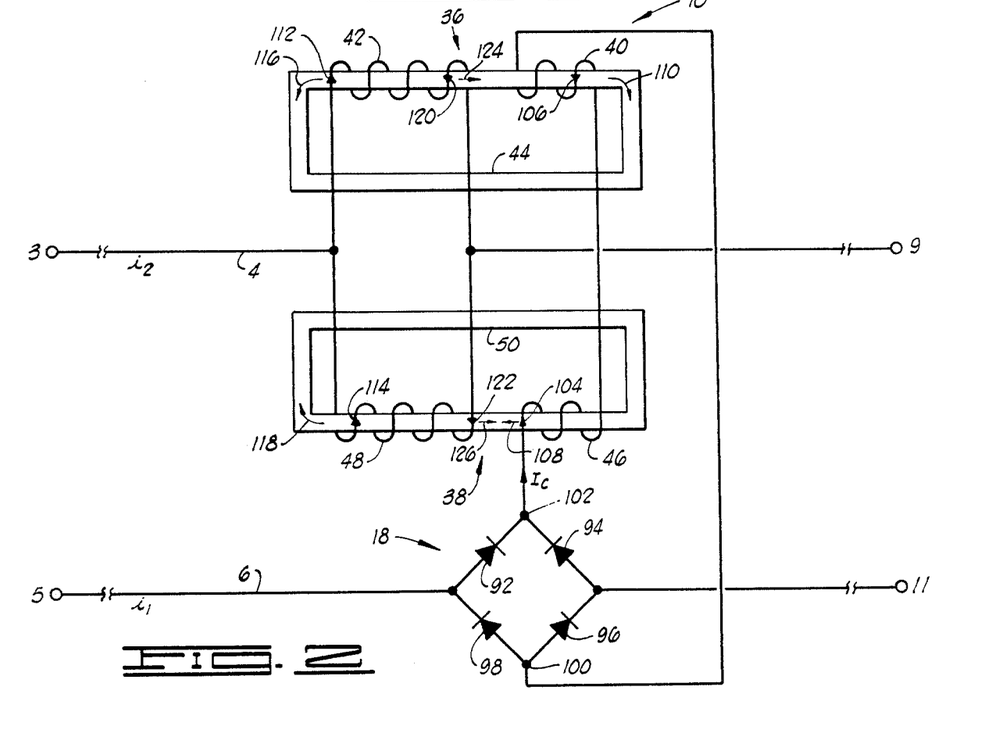
FIG. 2 is a detailed view of one of the rectifiers and one of the transformer pairs shown in FIG. 1.

With reference to FIG. 2 and assuming ideal components and ideal operation thereof, the operation of the present invention, generally, and of the embodiment shown in FIG. 1, particularly, will be shown. Because the present invention functions identically between any two phases, only the operation of one control means and one variable reactance means need to be discussed to disclose the operation of the present invention.

In FIG. 2 phase lines 4 and 6, variable reactance means 10, and control means 18 of FIG. 1 are shown. Phase line 6 carries alternating current $i_1$ and phase line 4 carries alternating current $i_2$. These currents are two of the phases of the three-phase source and in this embodiment $i_1$ controls $i_2$. To effect this control, control means 18 rectifies alternating current $i_1$ into effectively direct current $I_c$. Due to the nature of control means 18 the direction of $I_c$ in control windings 46 and 40 is always as indicated by arrows 104 and 106, respectively. $I_c$ passing through control winding 46 establishes a magnetic field in and around core 50 having a direction indicated by arrow 108. Direct current $I_c$ passing through control winding 40 likewise establishes a magnetic field in and around core 44 having a direction indicated by arrow 110. These magnetic fields tend to saturate cores 44 and 50 so long as $i_1$ is present. The intensities of the fields vary according to variations in the rms value of $i_1$. Because the presence and intensity of the fields depend only upon the presence and magnitude of $i_1$, there are no external adjustments necessary to maintain them.

Magnetic fields are also created by alternating current $i_2$ passing through gate windings 42 and 48. These fields are alternating because they are created by alternating current $i_2$. [It should be noted here that in all the embodiments described herein, the control windings are situated relative to the gate windings in each reactance means so that these alternating magnetic fields cancel at the location of the control windings or induce equal and opposite alternating voltages in parts of the control windings for zero net induced voltage. This prevents current from being induced in the DC control circuit.] During what will be called the positive portion of alternating current $i_2$, the current in gate winding 42 has the direction indicated by arrow 112 and the current in gate winding 48 has the direction indicated by arrow 114. These currents respectively create a field in and around core 44 having a direction indicated by arrow 116 and a field in and around core 50 having a direction indicated by arrow 118. During this portion of current $i_2$ it can be seen that the fields indicated by arrows 108 and 118 are in the same direction and therefore drive transformer 38 further into saturation. On the other hand, the fields indicated by arrows 110 and 116 are in opposite directions. If the field intensity of field 116 is not greater than that of field 110, then gate winding 42 acts as a low AC impedance and does not change the current therein. However, if field 116 is greater, the opposing magnetic fields induce a back electromotive force (emf) across gate winding 42. Because of this voltage, gate winding 42 effectively adds reactance to the current path between terminals 3 and 9, thus increasing the AC impedance, and thereby controlling the current therein. The magnitude of the voltage and consequent reactance depends on the intensity of the magnetic field generated by $I_c$. In this way $i_1$ controls $i_2$.

This same control also occurs during the negative portion of alternating current $i_2$. During this portion, the direction of the current is shown in gate winding 42 by arrow 120 and in gate winding 48 by arrow 122. These currents thus generate, respectively, a magnetic field having a direction as indicated by arrow 124 in and around core 44 and a magnetic field having a direction indicated by arrow 126 in and around core 50. Thus during this negative portion of $i_2$, the fields in and around core 44 indicated by arrows 110 and 124 add to drive transformer 36 further into saturation while the magnetic fields in and around core 50 indicated by arrows 108 and 126 oppose each other. When field 126 is greater than field 108, a voltage is induced across gate winding 48 thereby adding reactance to this winding. Thus, once again current control is obtained.

For this control to obtain the proper phase current magnitudes, the following equality must be maintained (FIG. 2 equivalents shown in parentheses):

$$\frac{\text{DC control current }(I_c)}{\text{AC "allowed" current }(i_2)} = \frac{\text{DC effective current }(I_c)}{\text{AC "generating" current }(i_1)} \quad (1)$$

Referring to FIG. 2, this equality is obtained by having an appropriate ratio between the number of turns of control winding 40 and the number of turns of gate winding 42 (and also between the turns of control winding 46 and gate winding 48) because the left-hand ratio of equation (1) depends on this turns ratio. This dependence arises because the magnetic field generated by $I_c$ passing through control winding 40 (or control winding 46) having an $N_1$ number of turns determines the maximum magnitude of current in gate winding 42 (or gate winding 48) which has an $N_2$ number of turns. Also, because current $i_2$ is ideally forced to divide equally between gate windings 42 and 48 on account of control windings 40 and 46 being effectively short circuited by control means 18 thereby prohibiting any unbalanced induced voltage therein, it will be assumed that such even split does occur for reasons of simplicity of explanation. Under this assumption, the above equal ampere-turns relationship which all saturable reactors follow is:

$$\frac{\text{current through reactance}}{\text{adding gate winding}} = \frac{\text{\# of control winding turns}}{\text{\# of gate winding turns}} I_c \quad (2)$$

$$\tfrac{1}{2} i_2 = \frac{N_1}{N_2} I_c \quad (3)$$

$$i_2 = \frac{2N_1}{N_2} I_c \quad (4)$$

$$\frac{I_c}{i_2} = \frac{N_2}{2N_1} \quad (5)$$

Substituting into equation (1) yields $$\frac{N_2}{2N_1} = \frac{I_c}{i_1}$$

Therefore, for the parallel path configuration of gate windings and the configuration of control windings in FIGS. 1 and 2, this is the equation to be satisfied to obtain equality between the controlling and controlled phases.

By using a full-wave rectifier as a control means as shown in FIG. 2, the ratio between $I_c$ and $i_1$ is 1:1. Thus, $$\frac{N_2}{2N_1} = 1 \quad (6)$$

$$N_2 = 2N_1 \quad (7)$$

The above calculations thus show that there must be twice as many turns in each gate winding as there are in each control winding for the embodiment shown in FIGS. 1 and 2 to maintain the equation (1) equality.

The above calculations show that ideally the two phase currents are maintained equal when the controlled current tries to exceed the controlling phase current. However, if the controlled current is less than the controlling phase current there is no equalizing interaction of magnetic fields to pull the controlled phase up to the controlling phase. This is true as between any two phases; but by concatenating the control and reactance means of individual lines as done by the present invention, equality of all the phase currents can ideally be obtained. In FIG. 2, $i_1$ controls $i_2$. From FIG. 1, $i_2$ controls a current $i_3$, the phase current in phase line 2, and $i_3$ controls $i_1$. Then from the above discussion concerning the control of each individual pair of phase lines, $|i_3| \leq |i_2|$, $|i_2| \leq |i_1|$, $|i_1| \leq |i_3|$. This reduces to $|i_3| \leq |i_2| \leq |i_1| \leq |i_3|$. Because $|i_3|$ cannot be less than itself, $|i_3| = |i_2| = |i_1|$. Therefore, the present invention obtains a simple, automatic balancing of all phases in a multi-phase system.

Figure 3:
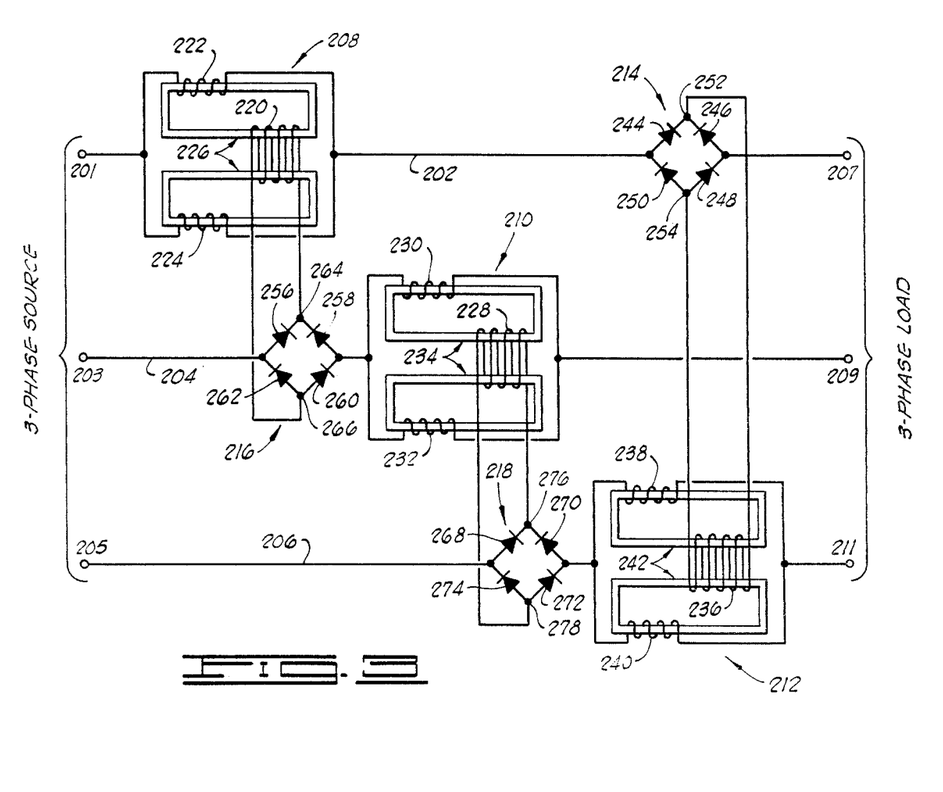
FIG. 3 is another embodiment of the present invention using three saturable reactors and three full-wave rectifiers in a three-phase power system.

FIG. 3 shows another embodiment of the present invention comprising in part phase lines 202, 204 and 206. These phase lines are connected to variable reactance means 208, 210 and 212 and to control means 214, 216 and 218, respectively. Phase lines 202, 204 and 206 terminate in source terminals 201, 203 and 205 and load terminals 207, 209 and 211, respectively.

Each variable reactance means in this embodiment is a parallel-connected saturable reactor. Saturable reactor 208 includes control winding 220 and gate winding 222 and 224 which are inductively linked by core 226. Control winding 220 is wound in the core 226 region which contains the closed magnetic fields arising from the passage of current through gate windings 222 and 224. Gate windings 222 and 224 are associated with core 226 so that one of the fields generated by the respective phase current passing therethrough is always in an opposite direction to the magnetic field created by the direct current in control winding 220. The gate windings are also connected in parallel with each other.

Saturable reactors 210 and 212 are constructed similarly to saturable reactor 208. Saturable reactor 210 has control winding 228, gate windings 230 and 232, and core 234. Saturable reactor 212 includes control winding 236, gate windings 238 and 240, and core 242. Control windings 228 and 236 are wound in the same region of their respective saturable reactors as is control winding 220 of saturable reactor 208. The respective gate windings, too, are similar to the gate windings in reactor 208.

Control means 214, 216 and 218 are full-wave rectifiers. Rectifier 214 comprises diodes 244, 246, 248 and 250 which are connected to form common cathode point 252 and common anode point 254. Rectifier 216 includes diodes 256, 258, 260 and 262, common cathode point 264, and common anode point 266. Rectifier 218 has diodes 268, 270, 272 and 274, common cathode point 276, and common anode point 278. Common cathode point 252 and common anode point 254 are connected to control winding 236. Common cathode point 264 and common anode point 266 are connected to control winding 220. Common cathode point 276 and common anode point 278 are connected to control winding 228. The remaining points of the interconnected diodes connect to respective phase lines as shown in FIG. 3.

Operationally, this embodiment performs the same as the embodiment shown in FIG. 1. Full-wave rectifiers 214, 216 and 218 each cause a direct current converted from each rectifier's respective phase current to flow through its respective control winding. Because of the nature of a full-wave rectifier this direct current always flows in the same direction. This unidirectional current causes reactance to be added to the respective controlled phase line through either gate windings 222, 230 and 238 or gate windings 224, 232 and 240 depending on the portion of the cycle of the current in the respective controlled phase line. This addition of reactance occurs as described above with reference to FIG. 2.

Figure 4:
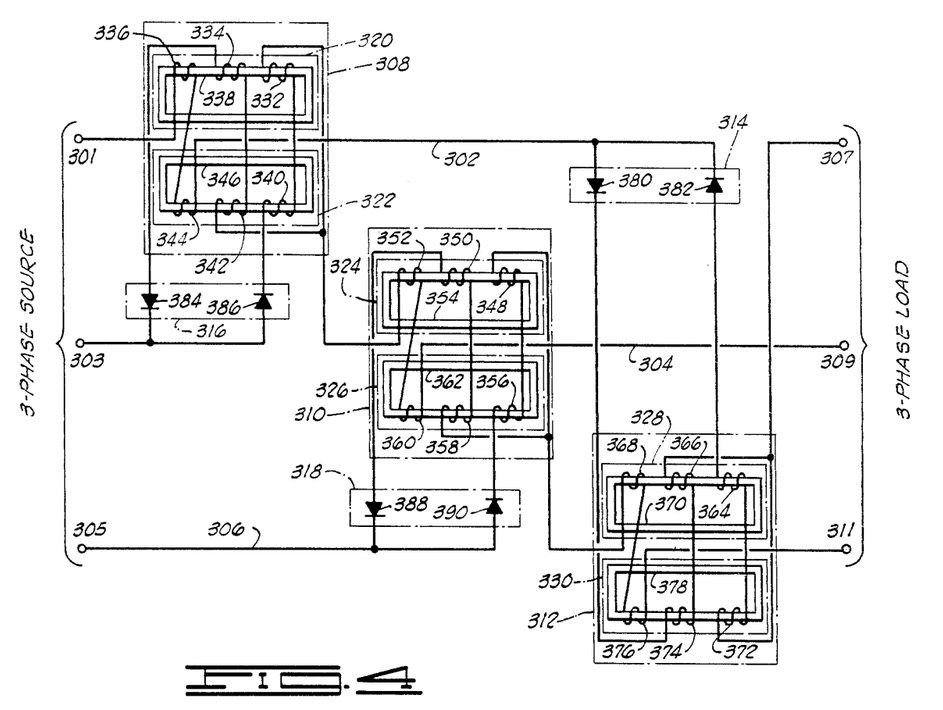
FIG. 4 is a third embodiment of the present invention using six 3-winding transformers and three 2-diode rectifiers in a three-phase power system.

FIG. 4 discloses still another embodiment of the present invention. The device disclosed in this Figure again is applicable to a three-phase power system. This compensator includes phase lines 302, 304 and 306. Interconnected with these phase lines are variable reactance means 308, 310 and 312 and control means 314, 316 and 318, respectively. Phase line 302 terminates at its source end in terminal 301 and at its load end in terminal 307; phase line 304 terminates at its source end in terminal 303 and at its load end in terminal 309; phase line 306 terminates at its source end in terminal 305 and at its load end in terminal 311.

Reactance means 308, 310 and 312 include a total of six three-winding transformers 320, 322, 324, 326, 328 and 330. Transformer 320 has control windings 332 and 334 and gate winding 336. Inductively connecting these windings is core 338. Transformer 322 includes control windings 340 and 342, gate winding 344, and core 346 inductively linking windings 340, 342 and 344. Control windings 332 and 340 are directly connected at one end; control windings 334 and 342 are directly connected at one end; gate windings 336 and 344 are directly connected at one end. The connection of winding 332 to winding 340 and the connection of winding 334 to winding 342 are made such that the magnetic fields generated by the passage of current through the respective windings have the same direction, i.e., the magnetic field generated by current through control winding 332 has the same direction as the magnetic field generated by the passage of current through control winding 340 and likewise the field generated at control winding 334 has the same direction as the field generated at control winding 342. The connection between gate windings 336 and 344 is such that the two magnetic fields created by the passage of current through these windings are in opposite directions. The preceding references to "same direction" and "opposite directions" refer to the clockwise or counterclockwise directions of the magnetic fields of the specific embodiment shown in FIG. 4 as defined by the physical law commonly known as the "Right-Hand Rule" and as viewed as depicted in FIG. 4. It is to be noted that, in general, the critical requirement in connecting the windings together is that the connections be made so that a zero net induced voltage results in the connected control windings from the alternating field established by current passing through the gate windings.

Transformer 324 has control windings 348 and 350, gate winding 352, and core 354. Transformer 326 has control windings 356 and 358, gate winding 360 and core 362. Control windings 348 and 356, control windings 350 and 358, and gate windings 352 and 360 are connected such that the fields created by the passage of currents through these windings are as described above with relation to transformers 320 and 322.

This same construction applies to transformers 328 and 330. Transformer 328 has control windings 364 and 366, gate winding 368 and core 370. Transformer 330 has control windings 372 and 374, gate winding 376 and core 378.

In the FIG. 4 embodiment control means 314, 316 and 318 are each two-diode rectifiers. Control means 314 includes diodes 380 and 382; control means 316 has diodes 384 and 386; control means 318 comprises diodes 388 and 390. The anode of diode 380 is connected to phase line 302 and the cathode of diode 380 is connected to the control winding 374 end which is not connected to control winding 366. The cathode of diode 382 is connected to phase line 302 and the anode of diode 382 is connected to the previously unconnected, or open end, of control winding 364. The cathode of diode 384 is connected to phase line 304 and the anode of diode 384 is connected to the open end of control winding 334. The anode of diode 386 is connected to phase line 304 and the cathode of diode 386 is connected to the open end of control winding 340. The cathode of diode 388 is connected to phase line 306 and the anode of diode 388 is connected to the open end of control winding 350. The anode of diode 390 is connected to phase line 306 and the cathode of diode 390 is connected to the open end of control winding 356.

Operationally, the embodiment shown in FIG. 4 is the same as that described with reference to the embodiment in FIGS. 1 and 3. Generally a direct current flows through one pair of control windings in each transformer pair to generate a saturation field and thereby induce a voltage across one of the gate windings of the transformer if the magnitude of the gate winding magnetic field is sufficiently large. The direct current is maintained through the control windings so that when the respective magnetic fields are generated by the passage of this current through the respective control windings which are shown located adjacent each other in FIG. 4 (e.g., windings 332 and 334, windings 340 and 342), the fields of the adjacent windings are in the same direction. In this way the reactance which is added to the controlled phase line is generated in either one or the other of the gate windings of each gate winding pair depending on the positive or negative portion of the alternating current which is being controlled.

Figure 5:
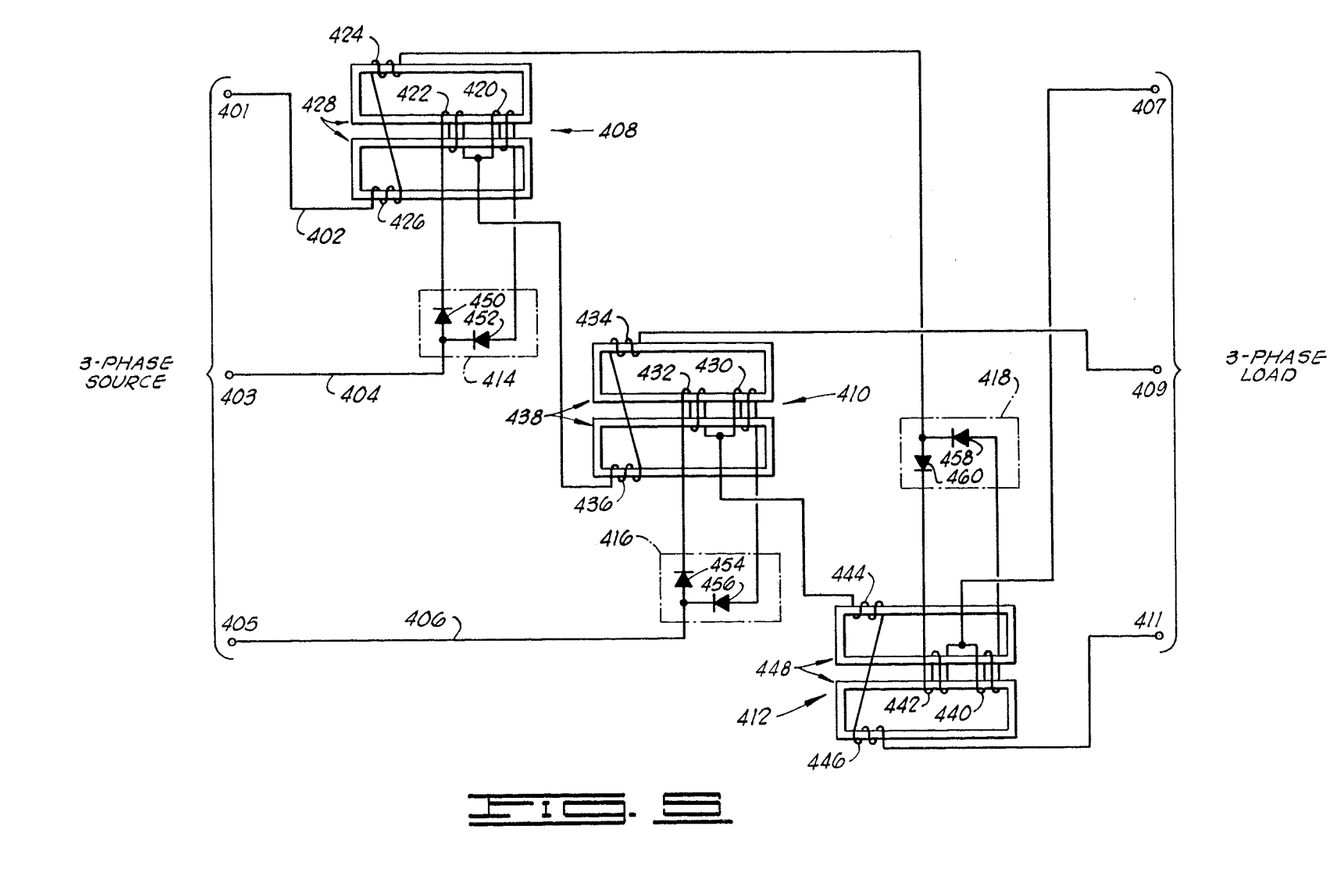
FIG. 5 is an additional embodiment of the present invention using three saturable reactors and three 2-diode rectifiers in a three-phase power system.
Figure 5A:
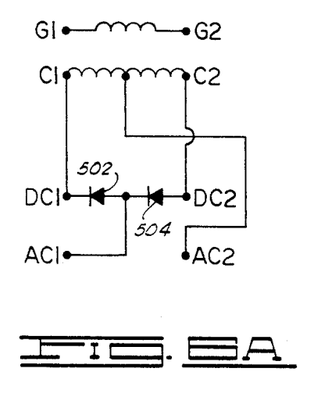
Figure 5B:
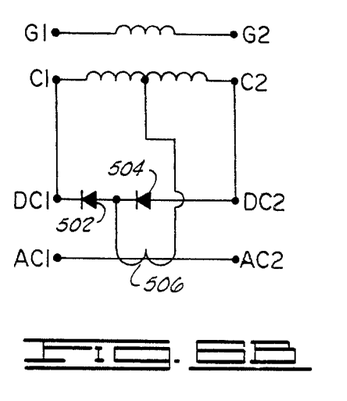
Figure 5C:
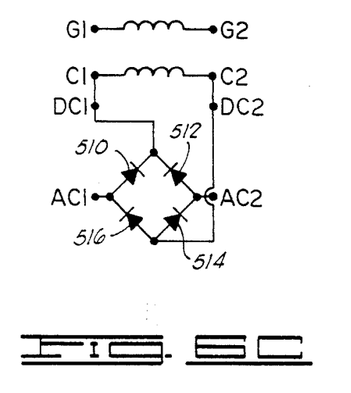
Figure 5D:
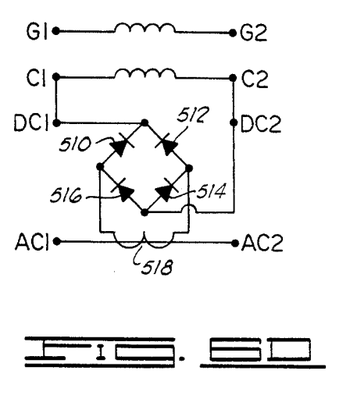

Still another embodiment of the present invention is shown in FIG. 5. This embodiment has phase lines 402, 404 and 406. Phase line 401 interconnects with variable reactance means 408 and control means 418 to control phase line 406. Phase line 402 terminates at its source end in terminal 401 and at its load end in terminal 407. Phase line 404 interconnects with variable reactance means 410 and control means 414 to control phase line 402. Phase line 404 terminates at its source end in terminal 403 and at its load end in terminal 409. Phase line 406 interconnects with variable reactance means 412 and control means 416 to control phase line 404. Phase line 406 terminates at its source end in terminal 405 and at its load end in terminal 411.

Variable reactance means 408 is a series-connected saturable reactor which includes control windings 420 and 422, gate windings 424 and 426, and a core 428 for inductively coupling the windings. Control windings 420 and 422 are wound on the portion of core 428 which contains the closed fields which are generated by the passage of current through gate windings 424 and 426. These control windings are connected so that the passage of current through either one of them generates a magnetic field which maintains a constant direction regardless of which winding is generating the field. Gate windings 424 and 426 are connected in this particular embodiment so that the fields generated by the passage of current through these windings are both in the same clockwise or counterclockwise (depending upon which portion of the alternating current is generating the field) direction as viewed in FIG. 5.

Reactance means 410 is also a series-connected saturable reactor. This saturable reactor has control windings 430 and 432, gate windings 434 and 436, and core 438. The control and gate windings are connected in the same fashion as those connected in saturable reactor 408.

Reactance means 412 is a series-connected saturable reactor having control windings 440 and 442, gate windings 444 and 446, and core 448. These windings, too, are connected the same as those in saturable reactor 408.

Control means 414, 416 and 418 are two-diode rectifiers. Control means 414 includes diodes 450 and 452. Diode 450 has its cathode connected to the free end of control winding 422 and its anode connected to phase line 404. Diode 452 has its anode connected to the free end of control winding 420 and its cathode connected to phase line 404.

Control means 416 includes diodes 454 and 456. Diode 454 has its cathode connected to the free end of control winding 432 and its anode connected to phase line 406. Diode 456 has its anoe connected to the free end of control winding 430 and its cathoe connected to phase line 406.

Control means 418 includes diodes 458 and 460. Diode 458 has its anode connected to the free end of control winding 440 and its cathode connected to phase line 402. Diode 460 has its anode connected to phase line 402 and its cathode connected to the free end of control winding 442.

This embodiment functions the same as the preceding embodiments by adding reactance to one of the two gate windings of each gate winding pair as a result of magnetic field opposition to the magnetic field created by the passage of a direct current through one of the control windings.

FIG. 6 depicts several schematics of control means circuits. G1 and G2 represent the respective ends of the gate winding connections. C1 and C2 represent the respective ends of the control winding sections. DC1 and DC2 represent the cathode and anode points of the control means to which C1 and C2 connect. AC1 and AC2 represent the alternating current terminals of the control means.

FIG. 6a shows a two-diode rectifier circuit similar to the one used in the embodiments shown in FIGS. 4 and 5. This circuit has diodes 502 and 504. This type of circuit connection can be used cost efficiently at low current levels because the expense for low current dioes is relatively small.

FIG. 6b shows a two-diode rectifier circuit for use at high current levels. Here the same diodes 502 and 504 are used, but a current transformer 506 which is shown as an ideal current source is added to step the current down from that used between AC1 and AC2 to a level which can be handled by the low current, cost efficient diodes 502 and 504.

Because the ratio of the AC1-AC2 current to the DC1-DC2 current in FIG. 6a is different from the ratio of the currents in FIG. 6b as a result of the current transformer, the turns ratios of the control to gate windings of the two Figures must be different so that the previously mentioned ratio of the effective direct current to the controlling alternating current will remain identical to the ratio of the effective direct current to the controlled alternating current. For example, if AC1-AC2 in FIG. 6b were carrying 10 amps and current transformer 506 stepped this current level down to 1 amp in the diode circuit, then the ratio of the effective number of turns of the C1-C2 windings to the effective number of turns of the G1-G2 windings must be 10:1 also. [Note: the schematic symbols for the windings shown in FIGS. 6a-6d are not intended to represent any functional ratio of turns.]

FIG. 6c schematically shows the full-wave rectifier control means shown in FIGS. 1 to 3. As in FIG. 6a, this schematic shows a low current embodiment using low current, cost efficient diodes 510, 512, 514 and 516.

FIG. 6d shows a schematic of a high current embodiment using the same diodes as used in the FIG. 6c schematic but also having a current transformer 518. This current transformer 518 functions the same as the one in FIG. 6b, and similarly the ratios between the controlling current, the direct current, and the controlled current must be maintained.

The above-described embodiments automatically compensate unbalanced three-phase power system currents which, if uncorrected, prevent such things as satisfactory motor operation. Squirrel-cage motors, such as irrigation pump motors and oil field submersible pump motors, are notably prone to unbalanced problems.

Unbalanced current in irrigation pump motors is often due to an unbalanced primary and an unbalanced transformer connection, two phase wires and a neutral and an open Y-open delta transformer connection. In submersible pump motor applications unbalanced current is often due to an unbalanced system, but it is also often due to unbalanced impedance in the three-conductor power cable which extends to the motor at the bottom of the well. Both of these problems are solved by the present invention.

Regardless of the cause of the unbalance, however, the invention described herein will automatically compensate and balance the current in every phase. Thus, the present invention for compensating unbalanced current in multi-phase power systems is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. Apparatus for automatically balancing the magnitudes of a plurality of alternating electrical currents carried by respective electrical conductors comprising:
   a plurality of control means, each of which is connected to a separate one, and only one, of said conductors, for converting the respective alternating current carried thereby into a control signal; and
   a plurality of variable reactance means, each of which is connected to a separate one, and only one, of said control means and to a separate one, and only one, of said conductors other than that conductor to which the respective separate one of said control means is connected, for changing the reactance in the respective conductors responsive to control signals from the respective separate ones of said control means to thereby automatically and without presetting control said alternating current in each of said electrical conductors.

2. The apparatus as recited in claim 1 wherein each of said control means comprises means for rectifying said alternating current carried by said electrical conductor to which the respective control means is connected.

3. The apparatus as recited in claim 1 wherein each of said variable reactance means comprises:
   a control winding which carries the respective control signal and thereby generates a uni-directional magnetic field;
   a gate winding; and
   means for inductively connecting said control winding and said gate winding.

4. The apparatus as recited in claim 3 wherein each of said gate windings carries the alternating current of the respective electrical conductor to which the respective reactance means is connected to thereby generate a first magnetic field which has a direction opposite to the direction of said magnetic field generated by the respective control winding, and a second magnetic field having a direction which is in the same direction as the magnetic field generated by the respective control winding.

5. The system as recited in claim 1 wherein each of said variable reactance means is a saturable reactor.

6. The system as recited in claim 1 wherein each of said variable reactance means comprises two interconnected transformers.

7. Apparatus for automatically equalizing the magnitudes of a plurality of phases of electrical current carried by respective electrical conductors in a multi-phase power system comprising:

a plurality of control means, each of which is connected to a separate one, and only one, of said conductors, for converting the respective phase current carried thereby into a control signal; and a plurality of variable reactance means, each of which is connected to a separate one, and only one, of said control means and to a separate one, and only one, of said conductors other than that conductor to which the respective separate one of said control means is connected so that a concatenation of said control means, reactance means and electrical conductors is formed, for changing the reactance in the respective conductors responsive to control signals from the respective separate ones of said control means to thereby automatically and without presetting equalize said phase currents in each of said electrical conductors.

8. The apparatus as recited in claim 7 wherein each of said control means comprises means for rectifying said phase current carried by said electrical conductor to which the respective control means is connected.

9. The apparatus as recited in claim 7 wherein each of said variable reactance means comprises:

a control winding which carries the respective control signal and thereby generates a uni-directional magnetic field;

a gate winding; and means for inductively connecting said control winding and said gate winding.

10. The apparatus as recited in claim 9 wherein each of said gate windings carries the phase current of the respective electrical conductor to which the respective reactance means is connected to thereby generate a first magnetic field which has a direction opposite to the direction of said magnetic field generated by the respective control winding, and a second magnetic field having a direction which is in the same direction as the magnetic field generated by the respective control winding.

11. The system as recited in claim 7 wherein each of said variable reactance means is a saturable reactor.

12. The system as recited in claim 7 wherein each of said variable reactance means comprises two interconnected transformers.

13. A compensator for balancing each of three phases of electrical current carried in a respective one of first, second and third electrical conductors, of a three-phase power system comprising:

a first variable reactance means including a first control winding, a first gate winding, and a first means for inductively connecting said first control and said first gate windings, said first gate winding connected in line relation with said first electrical conductor carrying the first of said three phases for varying the reactance in said first electrical conductor;

a second variable reactance means including a second control winding, a second gate winding, and a second means for inductively connecting said second control and second gate windings, said second gate winding connected in line relation with said second electrical conductor carrying the second of said three phases for varying the reactance in said second electrical conductor;

a third variable reactance means including a third control winding, a third gate winding, and a third means for inductively connecting said third control and said third gate windings, said third gate winding connected in line relation with said third electrical conductor carrying the third of said three phases for varying the reactance in said third electrical conductor;

a first control means connected only to said first electrical conductor carrying the first of said three phases for converting said phase current into a first control signal and to said second control winding of said second variable reactance means to thereby automatically and without presetting control the reactance of said second gate winding of said second variable reactance means;

a second control means connected only to said second electrical conductor carrying the second of said three phases for converting said phase into a second control signal and to said third control winding of said third variable reactance means to thereby automatically and without presetting control the reactance of said third gate winding of said third variable reactance means; and a third control means connected only to said third electrical conductor carrying the third of said three phases for converting said phase into a third control signal and to said first control winding of said first variable reactance means to thereby automatically and without presetting control the reactance of said first gate winding of said first variable reactance means.

14. The compensator as recited in claim 13 wherein each variable reactance means is a saturable reactor.

15. The compensator as recited in claim 13 wherein each of said variable reactance means comprises two interconnected transformers.

16. The compensator as recited in claim 13 wherein each of said control means comprises means for rectifying each respective phase current into an effectively direct current control signal.

17. A method for automatically balancing the magnitudes of a plurality of phases of electrical current of multi-phase power systems, comprising the steps of:

converting each of said phases of electrical current into a respective control signal; and linking each of said control signals to a respective one, and only one, of a plurality of variable reactance means, each of said variable reactance means being connected to a respective one, and only one, of said phases, to thereby automatically and without presetting control all of said phases of electrical current.

* * * * *

UNITED STATES PATENT AND TRADEMARK OFFICE
CERTIFICATE OF CORRECTION

PATENT NO. : 4,352,026

DATED : September 28, 1982

INVENTOR(S) : Donald W. Owen

It is certified that error appears in the above-identified patent and that said Letters Patent are hereby corrected as shown below:

Abstract, line 4, change "evices" to --devices--. Column 1, lines 12 and 13, "2. Description of the Prior Art (Prior Art Statement)" should be set off in its own paragraph and underlined; line 16, change ">" to --§--; line 46, change "Dreyus" to --Dreyfus--. Column 10, line 17, change "401" to --402--; line 68, change "anoe" to --anode--. Column 11, line 1, change "cathoe" to --cathode--; line 27, change "dioes" to --diodes--. Column 12, line 2, change "unbalanced" to --unbalance--.

Signed and Sealed this

Twelfth Day of July 1983

[SEAL]

Attest:

GERALD J. MOSSINGHOFF

Attesting Officer

Commissioner of Patents and Trademarks